Nov. 26, 1957 — K. R. STOHN — 2,814,523
FISHING TOOL FOR WELL DRILLING
Filed Oct. 1, 1954 — 2 Sheets-Sheet 1

INVENTOR.
KENDALL R. STOHN
BY Philip H. Sheridan
ATTORNEY

Nov. 26, 1957 K. R. STOHN 2,814,523
FISHING TOOL FOR WELL DRILLING
Filed Oct. 1, 1954 2 Sheets-Sheet 2

INVENTOR.
KENDALL R. STOHN
BY
*Philip H. Sheridan*
ATTORNEY

United States Patent Office 2,814,523
Patented Nov. 26, 1957

2,814,523
FISHING TOOL FOR WELL DRILLING

Kendall R. Stohn, Englewood, Colo.

Application October 1, 1954, Serial No. 459,607

7 Claims. (Cl. 294—102)

This invention relates to a fishing tool adapted to be employed as a tool in drilling wells and the like for attachment to stuck or lodged objects in the well or bore and is an improvement over the tool described and claimed in my United States Patent No. 2,687,323, issued August 24, 1954.

As is well known in this art, a fish may be a broken sucker rod, stuck drill pipe, tubing casing or other members commonly employed in drilling, and one of the objects of this invention is to provide an improved tool for gripping such fish to unlodge or retrieve same. Many problems and difficulties exist in fishing as, for example, it might be desirable to back a joint or section of pipe out of a portion of the hole, and if such is the case, the fishing tool should be constructed to provide conditioning for fish gripping upon movement to the left and locking preventing fish gripping upon movement to the right. On the other hand, in making up a joint it is often desirable to have the tool provide for fish gripping conditioning upon movement to the right and inoperative locking upon movement to the left. It is a further object of the present invention to provide an improved tool that can be conditioned for fish gripping by either left or right hand rotation of the string or drill stem to which the tool is attached.

Another object of my invention is to provide an improved fishing tool of the overshot type that has the same ultimate function and purpose of the tool of my said patent, but which is less expensive to construct and is simpler to operate, as will be apparent upon considering the following detailed description in conjunction with the accompanying drawings in which.

Figure 1:
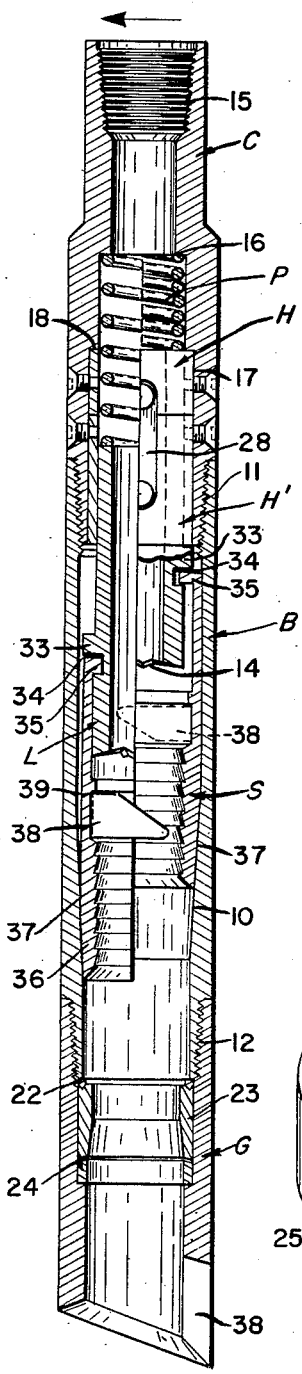
Figure 1 is a longitudinal sectional view, with some of the parts shown in full, of an overshot fishing tool embodying my invention, part of said tool being illustrated in operative fish engaging position and part being illustrated in locked inoperative position.
Figure 2:
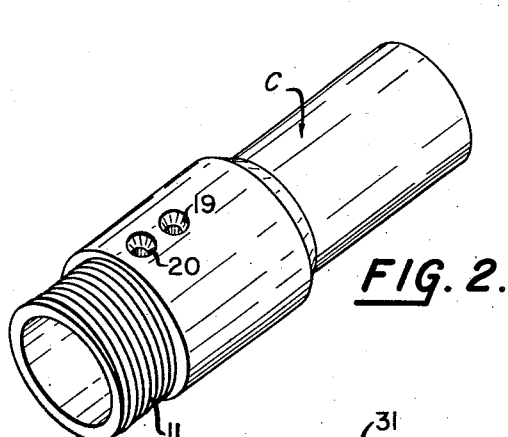
Figure 2 is a perspective view of the top member employed in connecting the tool to the string of the drill stem.
Figure 3:
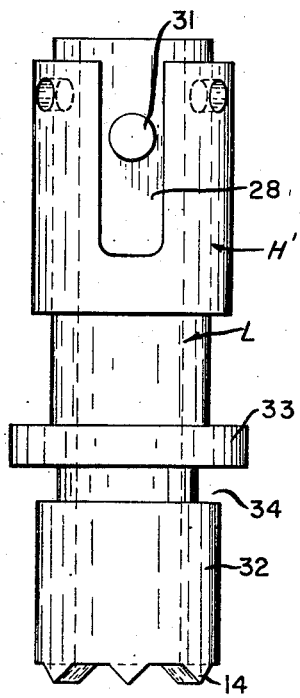
Figure 3 is an elevation view of a sleeve having lugs for cooperation with slots in a substantially cylindrical member shown as surrounding a portion of the sleeve.
Figure 4:
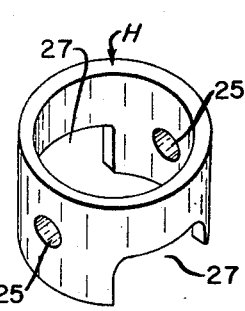
Figure 4 is a perspective view of a second substantially cylindrical member having cut-out areas for receiving the lugs of the sleeve.

Referring to the drawing in detail, which discloses the preferred embodiment of my improved fishing tool of the overshot type, the tool comprises the following principal parts: a top connecting sub C within which are positioned substantially cylindrical members H and H', a tubular body B threadedly connected at 11 to said sub C, and a guide member G threadedly connected at the lower end of body B as at 12. Also, there is a sleeve L functioning as a locking member and having pins or lugs 31 and prongs or teeth 14 thereon, said lugs cooperating with members H and H'. S represents slips which are rotatably connected with sleeve L through a tongue and groove connection hereinafter described in detail. The upper end of the locking member L has a pressure spring P acting thereon, and all of these principal parts are associated together in a manner best illustrated in Figure 1 wherein two positions of the slips within body B is shown.

In Figure 1, one of the slips S is illustrated as being in a downward position and another in an upward position with respect to the vertical elevation of the tool. Hereinafter reference will be made to the slips being in released position and fish engaging position, and it is to be understood that the latter means the slips are downwardly within the body B and the former refers to their upward position within body B.

It will be noted that the top connecting member C has an internal threaded socket 15 at its upper end whereby the overshot may be threaded to the lower end section (not shown) of the drill stem and lowered into the well by the stem, thus being controlled thereby from the top of the well during fishing operations. Beneath the socket 15, the member C is provided with an inturned abutment or flange 16 to be engaged by the top convolution of spring P. Member C is also provided with an enlarged socket 17 for receiving cylindrical members H and H', the top of member H abutting shoulder 18 of socket 17. Numerals 19 and 20 represent apertures in an enlarged portion of member C for receiving screws 26 and 30, as is clearly shown in Figure 6, and the bottom part of connecting sub C is threaded for detachable connection with body B at 11.

Referring to body B, above the threaded connection 12 there is provided a full conical surface 10 for cooperation with the slips S. Beneath the connection 12, there is provided in the guide G a plurality of packing elements 22, 23 and 24 of any suitable construction or design. The guide G has a cut-out 38 in its wall so as to facilitate the entry of the fish into the overshot tool whereby it can be properly engaged by the slips S and, of course, the fish could enter through the bottom of the guide. Further, it is to be noted that the entire overshot tool, including locking member L, has a passage completely therethrough so that fluid can be circulated down the drill stem and through the overshot and thus accomplish washing of the fish.

Figure 6:
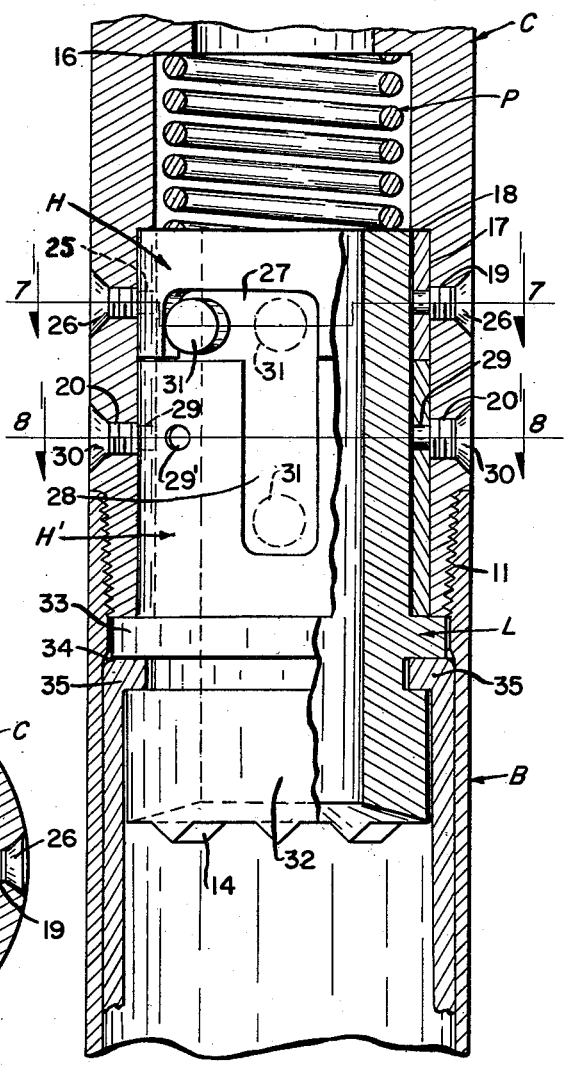
Figure 6 is an enlarged elevation view, partly in section, of a portion of the showing in Figure 1.
Figure 7:
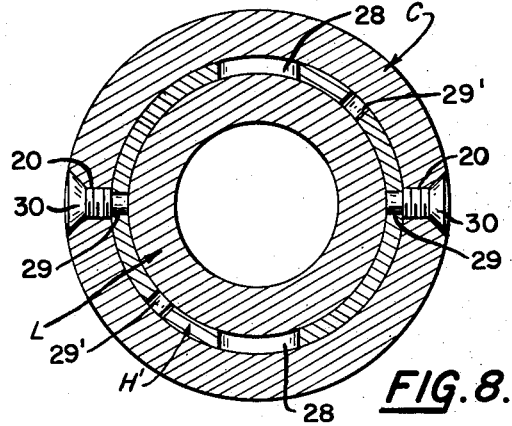
Figure 7 is a sectional view taken along the lines of 7—7 of Figure 6.

The shell H of cylindrical configuration is provided with diametrically opposed openings 25 for receiving the reduced ends of screws 26 that are threaded in apertures 19. By this means, the shell H is locked in position in connecting member C, as illustrated in Figures 1, 6, and 7, and it is to be understood the shell H remains in this position during right and left hand movement or operation of the tool, this not being the case with respect to shell H of my said patent. The present shell H, as illustrated, is also provided with diametrically opposed cut-out areas 27 adjacent the bottom thereof, and these areas provide lateral legs of slots, as will hereinafter be explained.

Figure 8:
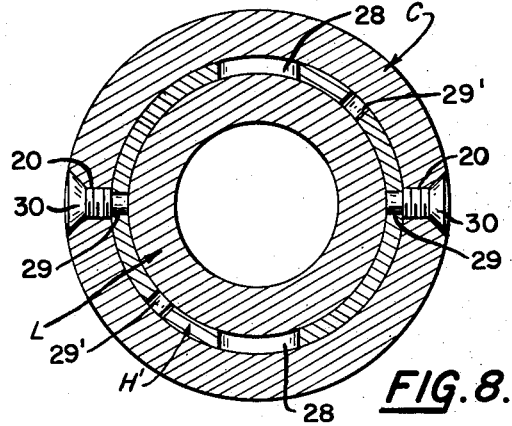
Figure 8 is a sectional view taken along the lines 8—8 of Figure 6.

Shell H', also of cylindrical configuration, has, as illustrated, diametrically opposed slots 28 and diametrically opposed apertures or openings 29 and 29' for receiving the ends of screws 30, as illustrated in Figures 3, 5, 6, and 8, the reduced ends of screws 30 functioning to position and support shell H' in either of two positions within member C. As indicated, shell H will be clutched to member C when screws 26 are as shown in Figure 7 and shell H' is adapted to be clutched thereto also in either of two positions, depending upon whether the screws 30 extend through holes 29, as illustrated in Figure 8, or through holes 29' when H' is rotated within socket 17 to align the holes 20 and 29'. Therefore, in operation of the tool, there can be no relative rotation or movement between parts C, H, H', and B and G, as should be apparent.

Positioned within the tubular sub or body B and member or head C and mounted for limited longitudinal movement therein is the locking member L and its upper part extends within shell H' and in some operations within shell H. The upper end thereof has welded thereon diametrically opposed lugs or pins 31, which pins are arranged to extend into slots 28 and cut-out areas 27. The lower end of locking member L is enlarged as at 32 and depending therefrom are a plurality of the teeth or prongs 14. Upwardly spaced from part 32 is a cylindrical flange or projection 33 extending from the main body of member L and this spacing provides a groove 34 for receiving inwardly extending flanges 35 of the slips S, and thus the slips are carried within body B by the locking member L. When the pins 31 are free to move in the longitudinal slots 28, then the locking member L will be free to move longitudinally, and thus the slips operated, as will become apparent.

The spring P engages the top part of member L and functions to apply longitudinal pressure to the locking member L and the slips S carried thereby. The spring is normally under compression, and whenever the member L is free to move longitudinally by the positioning of the pins 31 in the slots 28, the spring can expand to push the locking member relatively downwardly.

On the particular overshot illustrated there are only two slips S, but this number is not limited and may be increased if desired to preferably three or more. The slips S extend downwardly from the locking member L and are provided on their inner surface with gripping teeth 36, and the lower outer surface of each slip is provided with a partial conical surface 37 for cooperation with surface 10.

As will be apparent hereinafter, when prongs 14 engage a fish and the lugs 31 are positioned within areas 27, then there may be relative rotation or movement between connecting head C, shells H and H', tubular body B and guide G all connected together as a unit, and the locking member L and the slips carried thereby, the slips and locking member also being connected together as a unit. These prongs can engage the top of any fish, such as the pipe or tube, which is caused to be projected through the slot 38 or otherwise into the tool.

Figure 1 illustrates one of the slips S in operative position where it extends downwardly and rides on conical surface 10 and one in released position where it is normally held outwardly against the inner surface of body B by split ring spring 38. It will be noted that this spring is received in grooves 39 on the inner surface of the slips S so that the split ring will not be caught by the fish moving in the slips.

In describing the operation of the overshot, let it be assumed that the shell H' is mounted as shown in Figures 6 and 8 whereby substantial inverted J slots are formed by areas 27 and slots 28 with the lateral portions thereof extending to the left when viewed as in Figure 6. This will be called a left hand locking position of the tool. Under such conditions, the slips S may be locked in the inoperative or released position shown by giving such relative rotation between locking member L and shells H and H' that the lugs 31 will be in the lateral portions of the inverted J slots. At this time, the spring will be compressed as much as possible, and the tool may be lowered into the well by the drill stem in this inoperative condition. When the tool reaches the fish, which may be a drill pipe, tubing or casing which has become stuck in the well during drilling operations, the upper end of this fish will move in through the guide G and into the slips S which are held against the wall of the body member B by the ring 38 and the upper end of the fish will be engaged by the prongs 14. By now turning the drill stem in the direction of the arrow of Figure 1, the slips S can be released from their inoperative position, and this will result in the lugs 31 moving into the top of the longitudinal slots 28, the parts now being conditioned for fish gripping. If the drill stem is now pulled upwardly, the spring P will maintain the locking member L from upward movement with the stem, and therefore there will be an upward movement of the shells, head C and body B and guide G relative to the locking member and slips. This will result in the conical surface 10 on the body B forcing the slips inwardly and causing the teeth thereon to have gripping engagement with the upper end of the fish and, of course, the greater the pull upwardly, the greater the wedging action on the slips. The slips are now in their operative or fishing engaging position, and at any time it is desired to return the slips to the released position, it is merely necessary, assuming the fish cannot move downwardly within the well bore, to permit downward movement of the drill stem whereupon the drill stem, when the lugs 31 are at the top of slots 28, may be turned to the left to again have the lugs assume the locking position shown in Figure 6.

Figure 5:
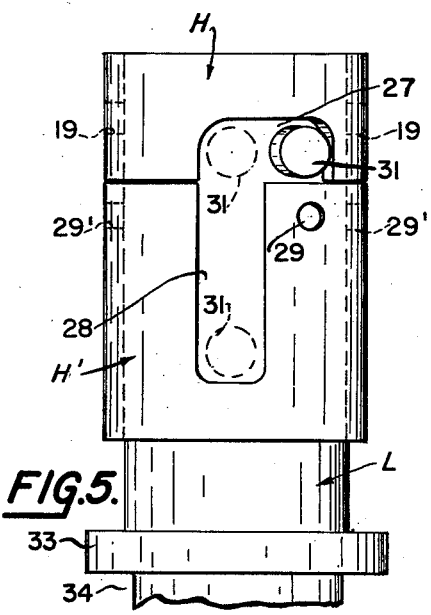
Figure 5 is an elevation view illustrating the cylindrical members surrounding a portion of the sleeve.

If it should be desired to operate the overshot tool so that the slips S will be locked in inoperative or released position by a rotation of the drill stem in a direction the same as the arrow, that is, a right hand operation, this can be done by repositioning by rotation the shell H' in socket 17. In such reposition, holes 20 will be aligned with holes 29' and the screws 30 may then be applied therethrough to lock the shell H' to the head C and the J slots or combined openings will appear as indicated in Figure 5. Now, the slips and locking member may be moved longitudinally by rotation of the head C and parts connected thereto to the left, which places the lugs 31 above longitudinal slots 28 and results in left hand conditioning for fish gripping.

From the foregoing description, it will be apparent that I have devised a very rugged and durable fishing tool having a minimum number of parts and which is designed to permit right rotation for locking the slips in released position and left rotation for conditioning for fish engaging position of the slips or vice versa. To make such a change it is merely necessary to rotate shell H' within socket 17 from one to the other of two positions.

The improvements in the present tool over that of my said patent should be apparent, but to repeat briefly, the present tool is simpler and less expensive to manufacture, is much easier to convert to right or left operation, is free of certain parts such as subs T and M of my said patent, and does not have certain difficulties encountered in the operation of the tool of said patent, such as the friction present in positioning lugs 28 in the lateral legs 21 of said patent.

The above description and drawings disclose a single embodiment of the invention, but it will nevertheless be understood that no limitations of the scope of the invention are thereby contemplated, and that various alterations and modifications may be made such as would occur to one skilled in the art to which the invention relates.

What is claimed is:

1. In a fishing tool of the class described, means for gripping a fish, two members mounted for limited relative longitudinal and rotative movement, means for operating said gripping means by relative longitudinal movement between said members of the tool, means for locking the gripping means in inoperative position by rotation of one of said members relative to the other in one direction, and means for mounting said members in a different relationship so that locking can be accomplished by rotation of said one member relatively to the other in the opposite direction, said locking means, regardless of the relationship of said members, comprising a single substantial J slot in the one member and a lug carried by the other member and projecting into the slot, said one member being constructed so as to be respositionable in part, and thus change the lateral leg of the slot from one side to the other of the longitudinal connecting leg thereof so that the opposite direction of rotation for locking can be accomplished.

2. Apparatus as defined in claim 1 wherein said one member comprises first and second abutting cylindrical shells, the second shell having a longitudinal leg of a slot and being adapted for mounting in two positions by rotation with respect to the body, the first shell being mountable in one position only and having a cut-out area communicating with the longitudinal leg of the second shell in both positions, said cut-out area forming a lateral leg of the slot on one side of the longitudinal leg when the second shell is mounted in one position and a lateral leg on the other side of the longitudinal leg when the second shell is mounted in the other position.

3. In an overshot tool of the class described, a tubular body, slips mounted in the body for relative longitudinal movement, cooperating means on the slips and body moving the slips inwardly by relative longitudinal movement of the body and slips, and means for controlling the relative movement between the slips and body, said last named means including a pair of substantially cylindrical members carried by the body, means for mounting one of said members in the body in two positions, said members having a cut-out area to provide a substantial J slot in either of said positions of the one member, but with the lateral leg of the J reversed in each position, means associated with the slips and having a part cooperating with the slot in either position of the one member, said slips being locked against relative longitudinal movement by rotation of the body in one direction with the part being positioned in the lateral leg, and said slips being locked similarly with the lateral leg reversed, but upon body rotation in reverse.

4. In an overshot tool of the class described, a tubular body, a pair of abutting tubular shells in said body, one of said shells having a cut-out area and being permanently mounted on the body, the other of the two shells having a longitudinal cut-out area and being mountable on the body by rotation with respect thereto in either of two positions, said cut-out areas forming a substantial J slot in either position with the lateral leg being on one side of the longitudinal leg in one position and on the other side in the other position, slips mounted in the body for relative rotative and longitudinal movement, means associated with the slips and having a part cooperating with the slot in either position of the other shell and limiting the relative rotative and longitudinal movement of the slips.

5. Apparatus as defined in claim 4 wherein the means associated with the slips comprises a locking member, having a lug extending therefrom and cooperating with the slot, said slips being inoperative and locked when the lug is in the lateral leg on either side of the longitudinal leg.

6. In a tool of the class described, a tubular body, slips mounted in the body for relative longitudinal movement, cooperating means on the slips and body for moving the slips inwardly by relative longitudinal movement of the body and slips, and means for controlling the relative movement between the slips and body including two shells carried by the body with each having a slot therein and a second member connected with the slips and having a part cooperating with the slots in the shells, each said slot being so formed that the cooperating part will permit the second member to move longitudinally relative to the body or to be locked against relative longitudinal movement by a rotation of the body in one direction with respect to the second member, one of said shells being mountable within the body in another position by rotation with respect to the body so that the slot therein will require rotation of the body in the opposite direction to lock the second member against relative longitudinal movement with respect to the body.

7. Apparatus as defined in claim 6 wherein the combined slot in both shells is in the form of a single J with the lateral leg thereof being reversed with respect to the longitudinal leg thereof when the one shell is repositioned.

References Cited in the file of this patent
UNITED STATES PATENTS
1,528,561    Nixon  ------------------ Mar. 3, 1925